United States Patent
Miller et al.

(10) Patent No.: US 10,653,165 B2
(45) Date of Patent: *May 19, 2020

(54) SYSTEMS AND METHODS FOR PRODUCING FERMENTED MILK REPLACER AND METHODS OF FEEDING SAME TO ANIMALS

(71) Applicant: PURINA ANIMAL NUTRITION LLC, Shoreview, MN (US)

(72) Inventors: Bill L. Miller, Labadie, MO (US); Robert C. Musser, Woodbury, MN (US)

(73) Assignee: PURINA ANIMAL NUTRITION LLC, Arden Hills, MN (US)

( * ) Notice: Subject to any disclaimer, the term of this patent is extended or adjusted under 35 U.S.C. 154(b) by 77 days.

This patent is subject to a terminal disclaimer.

(21) Appl. No.: 15/860,259

(22) Filed: Jan. 2, 2018

(65) Prior Publication Data

US 2018/0125093 A1    May 10, 2018

Related U.S. Application Data

(63) Continuation of application No. 14/054,604, filed on Oct. 15, 2013, now Pat. No. 9,888,708.

(51) Int. Cl.
| | | |
|---|---|---|
| *A23K 10/12* | (2016.01) | |
| *A23K 10/30* | (2016.01) | |
| *A23K 20/10* | (2016.01) | |
| *A23K 20/189* | (2016.01) | |
| *A23K 10/14* | (2016.01) | |
| *A23K 50/10* | (2016.01) | |
| *A23K 50/60* | (2016.01) | |

(52) U.S. Cl.
CPC ............. *A23K 10/12* (2016.05); *A23K 10/14* (2016.05); *A23K 10/30* (2016.05); *A23K 20/10* (2016.05); *A23K 20/189* (2016.05); *A23K 50/10* (2016.05); *A23K 50/60* (2016.05)

(58) Field of Classification Search
CPC ........ A23K 10/12; A23K 10/30; A23K 20/10; A23K 20/189; A23K 10/14; A23K 50/10; A23K 50/60
See application file for complete search history.

(56) References Cited

U.S. PATENT DOCUMENTS

| | | | | |
|---|---|---|---|---|
| 4,483,874 A | * | 11/1984 | Olsen .................. | A23C 11/103 426/44 |
| 4,614,653 A | * | 9/1986 | Kakade ................. | A23K 10/28 426/2 |
| 2006/0233913 A1 | * | 10/2006 | Hansen ..................... | A23J 3/14 426/46 |

FOREIGN PATENT DOCUMENTS

| | | | | |
|---|---|---|---|---|
| CN | 102657295 A | * | 9/2012 | |
| CN | 102657295 A | | 9/2012 | |
| DE | 278058 A1 | * | 4/1990 | ................ A23J 1/14 |
| WO | WO 2012110778 A2 | | 8/2012 | |

OTHER PUBLICATIONS

Zou CN 102657295, published Sep. 12, 2012—Espacenet Patent Translate Machine Translation (This translation is machine-generated. It cannot be guaranteed that it is intelligible, accurate, complete, reliable or fit for specific purposes. Critical decisions, such as commercially relevant or financial decisions, should not be based on machine-translation output.).

"Changes of raffinose and stachyose in soy milk fermentation by lactic acid bacteria from local fermented foods of Indonesian"; Department of Food Science and Biotechnology,Technical Implementation Unit for Development of Chemical Engineering Processes, Indonesian Institute of Sciences Yogyakarta, Indonesia; Malaysian Journal of Microbiology, vol. 4(2) 2008, pp. 26-34.

Havrevoll, Oystein, "Bucket feeding and teat feeding of acidified or non acidified milk feed for rearing dairy goats", Agricultural University of Norway, Department of Animal Nutrition, pp. 486-487, date unknown.

McFeeters, R.F. et al., "Pectinolytic and Pectolytic Microorganisms", Compendium of Methods for the Microbiological Examination of Foods, 1992, Chapter 14, pp. 213-223.

Huisman, M.M.H. et al., "The CDTA-Soluble Pectic Substances from Soybean Meal are Composed of Rhamnogalacturonan and Xylogalacturonan but not Homogalacturonan", Biopolymers, vol. 58, 279-294 (2001).

Choct, M. et al. "Soy Oligosaccharides and Soluble Non-starch Polysaccharides: A Review of Digestion, Nutritive and Antinutritive Effects in Pigs and Poultry", Asian-Aust. J. Anim. Sci. vol. 23, No. 10 : 1386-1398, Oct. 2010.

(Continued)

*Primary Examiner* — Subbalakshmi Prakash
(74) *Attorney, Agent, or Firm* — Dorsey & Whitney LLP

(57) ABSTRACT

Young animals such as calves may be fed milk replacers containing soy having been preserved through treatment with acid-producing bacteria that reduces a pH of the milk replacer through microbial digestion of sugars present in soy to thereby produce a fermented milk replacer. The milk replacer is edible for at least 48 hours and its digestibility in the young animals is increased due to the microbial digestion of sugars in the soy that are otherwise indigestible in the gut of the young animals. The fermented milk replacers may be ingested by young animals in group settings. In addition, the milk replacers containing soy may be treated with enzymes adapted to hydrolyze complex indigestible carbohydrates within the milk replacer, potassium sorbate or both. Feeding systems incorporating these fermented milk replacers may result in increased gain and increased dry matter intake without negatively affecting animal health.

20 Claims, No Drawings

(56) References Cited

OTHER PUBLICATIONS

Wolfswinkel, Tricia Lee, "The effects of feeding fermented soybean meal in calf starter on growth and performance of dairy calves", Iowa State University, 2009, pp. 1-102.
Alwazeer et al. J Food Prot. Oct. 2002;65(10):1586-9, abstract.
Bentley, J. et al. Automatic Calf Feeding Systems: Is this Your Next Employee? www.extension.iastate.edu/.../Automatic%20Calf%2012. accessed May 12, 2015.

\* cited by examiner

SYSTEMS AND METHODS FOR PRODUCING FERMENTED MILK REPLACER AND METHODS OF FEEDING SAME TO ANIMALS

CROSS-REFERENCE TO RELATED APPLICATIONS

This application is a continuation of U.S. application Ser. No. 14/054,604 filed Oct. 15, 2013, issued as U.S. Pat. No. 9,88,708 on Feb. 13, 2018, the contents of which are hereby incorporated by reference.

TECHNICAL FIELD

The present disclosure relates to processes for fermenting indigestible sugars present in milk replacers that contain soy protein, and methods and systems of feeding such fermented milk replacers.

BACKGROUND

The two primary systems of feeding young livestock animals, such as calves, in a group situation are to employ an automated feeding system or to feed acid-preserved milk replacer or milk. Group feeding of these animals may be preferred over individual housing in that animals are allowed to socialize and are not restrained. Individual housing generally consists of small pens or stalls. With the latter system, the animals are usually tethered in some fashion. Individual housing has been the predominate system of raising calves as animals are isolated. This approach is believed to promote animal health, although healthy animals can be produced employing the group feeding method. A major consideration of individual housing of these animals is labor required to feed and maintain them.

Automated feeding systems are sold by several manufacturers and have been increasing in popularity in recent years. Systems are designed to identify animals using individual transponders and feed according to pre-designed feed schedules. These systems typically hydrate milk products at time of feeding. While the animals perform well using this approach, the cost of the system can be problematic, which can cost as much as $15,000 and thus can limit their application on a farm.

The second approach of feeding animals in a group setting is to employ a bulk tank that delivers milk to the young animals via tubing, nipples and check valves. This approach is quite inexpensive, however, the milk replacer will sour without preservation. Various acids are utilized to preserve milk replacer, however, issues with their use also exist. For example, formic acid is commonly used to preserve milk products, but when undiluted it is hazardous. Consequently, the risks of injury to the producer or poor performance to a producer's livestock is present unless this acid is properly diluted. In addition, formic acid is currently not approved by the FDA for use in milk replacers.

SUMMARY

The present disclosure overcomes the above problems by providing a method of fermenting milk replacers containing soy. Fermentation causes a reduction in pH in the milk replacer, which safely yields a preservative effect to the milk product. In addition, these milk replacers may be treated with enzymes adapted to hydrolyze complex indigestible carbohydrates within the milk replacer thereby making available nutrients to the animal as well as with potassium sorbate in order to prevent the growth of mold, yeast, spoilage organisms and pathogens. These fermented milk replacers may be used in connection with bulk delivery systems such as bulk feeding systems.

According to one implementation, a method of feeding a young animal involves fermenting a milk replacer comprising soy using an acid-producing bacteria, where the soy contains sugars, one or more of which are indigestible in the young animal. The acid-producing bacteria reduces the pH of the milk replacer and microbially digests the sugars such that the milk replacer is fermented. This fermented milk replacer is edible for at least 48 hours and its digestibility is improved by the microbial digestion of one or more indigestible sugars. The method continues by feeding the livestock animal the fermented milk replacer.

In another implementation, a method of feeding young animals in a group setting involves fermenting a milk replacer comprising soy using a lactic acid-producing bacteria. The lactic acid-producing bacteria reduces the pH of the milk replacer and microbially digests the sugars contained in the soy such that the milk replacer is fermented. The fermented milk replacer is edible for at least 48 hours and its digestibility by the young animals is increased by the microbial digestion of one or more indigestible sugars in the soy. The method continues by delivering the fermented milk replacer to the young animals in a group setting using a feeding system over the course of at least 48 hours after the treatment step.

In yet another implementation, a method of feeding calves prior to weaning involves obtaining an enzyme-treated, fermented milk replacer containing soy using a lactic acid-producing bacteria and an enzyme. The lactic acid-producing bacteria reduces the pH of the milk replacer and microbially digests the sugars such that the milk replacer is fermented. This fermented milk replacer is edible for at least 48 hours and its digestibility by the calves is increased by the microbial digestion of the one or more indigestible sugars. Enzymes hydrolyze complex indigestible carbohydrates thereby making available nutrients to the calf. The method continues by feeding the calves enzyme-treated fermented milk replacer, and as a result of ingestion, calves experience increased weight gain.

DETAILED DESCRIPTION

Systems and methods provide fermented and fermentable milk replacers, which may be used in connection with feeding animals. In certain implementations, enzymes and potassium sorbate may be added to these milk replacers.

Implementations provide for the fermentation of sugars in soy-containing milk replacers, which produces acids that can provide a preservative effect and extend the milk replacer shelf life. Acid-producing bacteria, also known as a starter culture, may be added to hydrated soy-containing milk replacers to produce acid from the fermentation (i.e., microbial digestion) of sugars present in the soy. The production of acid lowers the pH of the milk replacer to provide the preservative effect. However, a drastic reduction in pH can make the milk replacer unpalatable and may cause the animal to reduce consumption and performance. It has been found that fermented milk replacers having a pH between 4.0 and 6.0 may preserve milk replacer without the negative effects of reduced consumption and performance. However, it may be preferred to provide animals fermented milk replacer having a pH ranging from about 4.3 to about 5.3. Such fermented milk replacers may be edible for at least 48 hours and may be offered to animals over the course of about 96 hours. However, after about 72 hours from when a fermented milk replacer batch is prepared, it may be preferred to offer a new batch. In one example, after the addition of a lactic acid-producing starter culture, the pH of the milk replacer after about 24 hours ranges from about 4.7 to about 4.8. However the starter culture may be effective to preserve the fermented milk replacer by the production of acid within a few hours from its addition.

In addition to providing a preservative effect, it has been discovered that the production of acid through microbial digestion of certain sugars present in soy may improve the digestibility of the milk replacers in the animal. In particular, soy products included in milk replacers typically contain carbohydrates, protein and fiber. Generally, the carbohydrates in these soy-containing products include the sugars: glucose, sucrose, maltose raffinose and stachyose. Of these sugars, raffinose and stachyose are not digestible in the gut of mammals and this can present problems to the animal ingesting soy-containing milk replacers. However, during microbial digestion, these indigestible sugars are partially digested. As a result, ingestion of the fermented milk replacer with reduced levels of indigestible sugars may improve the overall digestibility of the milk replacer in the animal. In one example, milk replacers containing protein-modified soy may be treated with an acid-producing bacteria to cause the microbial digestion of indigestible sugars, and this treatment may improve digestion of the milk replacers in young animals such as calves. Furthermore, sugars present in soy-containing milk replacers including sucrose and maltose generally have limited digestibility in the animal, and thus microbial digestion of these sugars may improve digestion of the milk replacers in young animals.

Competitive exclusion may further be provided by the digestion of certain carbohydrates by the acid-producing bacteria, meaning that carbohydrates are not available to other bacteria such as pathogens and spoilage organisms.

Acid-producing bacterial cultures may be composed of or may contain lactic acid-producing bacteria. In one example, *Lactococcus* bacteria, a genus of lactic acid-producing bacteria, may be used in connection with forming fermented milk replacers. *Lactococcus* are homofermentors and solely produce lactic acid. Seven bacterial species within *Lactococcus* genus include, *L. lactis* (with subspecies *lactis*, *cremoris*, *hordniae* and *tructae*), *L. garvieae*, *L. plantarum*, *L. raffinolactis*, *L. piscium*, *L. chungangensis* and *L. fujiensis*. It is believed that any of the species within the *Lactococcus* genus may be used in connection with producing fermented milk replacers. *Lactococcus* bacteria are used in fermentation applications in the dairy industry and may be used as starter cultures or may be used in combination with other lactic acid-producing bacteria such as *Lactobacillus* and *Streptococcus*. In some implementations, *L. lactis* subsp. *lactis* and *L. lactis* subsp. *cremoris* may be preferred due to their ability to safely cause a drop in pH of the fermented milk product.

In one example, lactic acid-producing bacteria may be added to the milk replacer such that fermentation of soy and lactose causes the pH to drop to about 4.5 to about 4.8 (e.g., +/−0.05) after about 24 hours. In addition to providing a preservative effect to the milk replacer, the bacteria present may have probiotic benefits (e.g., antimicrobial, antimutagenic, anticarcinogenic and antihypertensive properties). Furthermore, the bacteria may digest about 40 to about 60 percent of the indigestible sugars stachyose and raffinose after about 48 hours from culture treatment.

Furthermore, milk replacers containing soy may additionally be treated with enzymes as it has been discovered that enzyme treatment of fermenting milk replacers may improve the dry matter intake and weight gain of calves. More particularly, enzyme treatment may hydrolyze complex indigestible carbohydrates (e.g., stachyose, raffinose, cellulose, hemicellulose, pectin (pectic polysaccharides)) within the milk replacer thereby making nutrients available to the animal. In addition, due to the liberation of a portion of the carbohydrates, these are more available to the bacteria for digestion and can result in sparing lactose. The enzyme may have multiple activities including but not limited to: beta-glucanase (e.g., endo-1,3(4)-beta-glucanase), pentosanase, hemicellulase, pectin-substance hydrolyzing activities as well as other minor activities (e.g., mannanase, cellulase, amylo-gluscosidase, amylase, and cellobiase). In some implementations, the enzyme may be isolated enzymes from *Aspergillus aculeatus*, which may provide the above-described activities.

Potassium sorbate may additionally be included in the milk replacers containing soy to prevent the growth of mold, yeast, spoilage organisms and pathogens. Potassium sorbate is generally active at a pH of 6.0 or below, and accordingly in some implementations, potassium sorbate may be activated in the milk replacer by a drop in pH upon the production of acid by the acid-producing bacteria.

The soy products that may be used in fermentable milk replacers may include soy meal, soy flour, protein-modified soy flour, and combinations thereof. Preferably, soy products are in the form of a fine powder having a particle size of about 20 to about 75 microns. Soy-containing milk replacers may be composed of about 1 to about 25 percent soy by dry weight of the milk replacer, and preferably about 22 percent soy by dry weight of the milk replacer. These milk replacers may include a nutritional content of between about 20 and 28 percent protein by dry weight of the milk replacer, and between about 16 to 24 percent fat by dry weight of the milk replacer. These fermentable soy-containing milk replacers may be used in combination with milk, non-soy-based milk replacers, and other soy products such as soy protein concentrate and soy isolate in which the indigestible sugars are washed out of the soy product.

Soy meal and soy flour contain a similar nutrient profile as soy flour is formed of finely ground soybean meal. Soybean meal is formed from steeping milled soybeans in hexane to dissolve fat, and the fat is then separated from the carbohydrate and protein components of the soy. Residual hexane is removed from the meal through heating (e.g., toasting). The process of heating yields a low PDI meal (e.g., around 20) in which the anti-nutritional factors (e.g., proteins) remain largely undenatured in the soybean meal.

Consequently, these soy products contain carbohydrates including the above-described sugars, including indigestible sugars; protein, including tightly coiled protein structures with anti-nutritional factors; and fiber. The protein structure coupled with the presence of anti-nutritional factors can be detrimental to the performance of young animals. Particularly, the gut tissue of young animals responds to ingested anti-nutritional factors by reducing the absorptive surface area, which may result in water being drawn into the digestive system resulting in diarrhea.

Protein-modified soy products, including protein modified soy flour, have anti-nutritional factors destroyed and are produced from defatted white flakes (also containing carbohydrates, protein and fiber) that have not undergone a heating process (e.g., toasting). The protein in the white flakes is modified through use of ethanol, heat and pressure treatment to hydrolyze the protein, which denatures and opens the protein structure and destroys anti-nutritional factors. In these protein-modified soy products, the above described carbohydrates and fibers are retained substantially unchanged as a result of the protein modification processing.

To ferment the milk replacer, a milk replacer containing soy is hydrated and combined with a selected amount of the bacterial cultures, enzymes and/or potassium sorbate to initiate the fermentation and preservation processes in the milk replacer. Alternatively, a milk replacer containing soy may be combined with these components prior to hydration, and upon hydration, the fermentation and preservation processes may be initiated.

In use, the hydrated, fermented milk replacer may be stored in bulk tanks and fed to young animals. Milk replacer untreated with the starter culture may be added directly to the bulk storage where the sugars therein may be fermented by the starter culture. This may enable animals to be fed from the same bulk container over the course of several days, whereas in prior approaches, milk replacers were treated with acids, which are dangerous and/or not approved for use in milk replacers (such as formic acid). In some cases, fermented milk replacers may be delivered to animals using automated feeding systems. Upon the addition of treated milk replacers, a producer may add treated or untreated milk replacer to the system without flushing. This may reduce waste associated with frequent system flushing, which may otherwise be required to avoid feeding animals untreated, spoiled milk replacer.

The fermented milk replacers of the present disclosure may be provided to young animals, such as young ruminants including calves, lambs and goat kids, during a pre-weaning phase, a weaning phase or both. In a pre-weaning phase, the animal generally ingests liquids, primarily milk replacer, and is offered starter feed. The weaning phase is generally when young animals are encouraged to consume only dry feed and occurs over the course of about 7 days. Generally calves and other young ruminants are fully weaned after about 42 days, and prior to weaning, may ingest fermented milk replacers in the diet, as described further in Trials 1-3.

Although benefits flowing from calves ingesting fermented milk replacers are disclosed herein, other animals may benefit from the feeding methods and systems and may include young animals, young livestock animals, young ruminants (e.g., lambs, kids and deer, in addition to calves), young monogastrics (e.g., foals and piglets), non-human young mammals.

Animals may be situated in a group setting and be offered the fermented milk replacers through group feeding systems such as bulk feeders or automated feeders.

Three trials were conducted to evaluate the merit of feeding a fermented milk replacer to calves, however, these trials should not be construed as limiting.

Trial 1: In this trial, calves were offered milk replacer via the three different approaches mentioned above. Twenty-seven (27) calves (nine animals per treatment) were allotted to an automated calf feeder (Forster Technik Vario Milk Powder Feeder, Gerwigstr, Germany), bulk group system preserved with organic acids (citric/malic) or a bulk group system preserved with a lactic acid-producing starter culture. Calves ranged in age from 2 to 5 days and weighed approximately 100 pounds. All calves received milk replacer containing 28 percent protein by dry weight of the milk replacer, 20 percent fat milk by dry weight of the milk replacer. This milk replacer contained 10 units of protein-modified soy produced according to the description above. Automated feeder-allotted calves were fed 2.78 pounds of milk replacer solids, daily. Bulk group fed calves had free access to milk replacer during this trial (13% solution). Starter feed containing 22 percent protein by weight (identified as Dry Feed in the tables to follow) was offered to all calves ad libitum. Blood samples were collected from all animals to ensure that colostrum was consumed and the Ig status was similar.

TABLE 1

Performance of calves fed milk replacer via different feeding systems
Feeding Treatment:

| | 1 Auto Feeder | 2 Organic acid | 3 Fermented | S.E. |
|---|---|---|---|---|
| Initial Ig | 4.22 | 4.11 | 4.00 | 0.36 |
| Calf Weights, lbs. | | | | |
| Day 0 | 102.36 | 102.49 | 102.46 | 0.64 |
| Day 42 | 154.10 | 159.28 | 155.10 | 6.01 |
| Avg. Gain, lbs. | | | | |
| Wk 1&2 | 16.42 | 19.79 | 19.24 | 3.05 |
| Week 3 | 9.10 | 10.67 | 7.16 | 1.96 |
| Week 4 | 9.83 | 10.39 | 8.18 | 1.70 |
| Week 5 | 10.10 | 9.21 | 10.96 | 1.20 |
| Week 6 | 6.29 | 6.73 | 7.11 | 1.92 |
| Total Gain | 51.74 | 56.79 | 52.64 | 5.95 |
| Avg. Period MR Consumption, lbs. (DM Basis) | | | | |
| Total CMR | 92.83b | 90.90b | 79.00a | 1.25 |
| Avg. Period Dry Feed Consumption, lbs. (As Fed) | | | | |
| Total Dry Feed Cons. | 28.90 | 45.30 | 59.60 | |
| Body Volume, cm$^3$ | | | | |
| Day 0 | 175.91 | 181.44 | 184.76 | 3.50 |
| Day 42 | 245.87 | 252.24 | 251.83 | 7.73 |
| Gain | 69.97 | 70.81 | 67.03 | 7.06 |
| Avg. Period Scour Score | | | | |
| Wk 1&2 | 1.16 | 1.17 | 1.20 | 0.06 |
| Period Scour Days | | | | |
| Wk 1&2 | 2.22 | 2.11 | 2.56 | 0.77 |
| Attitude Score | | | | |
| Weeks 1&2 | 1.02 | 1.02 | 1.02 | 0.02 |

Means in the same row not followed by a common letter differ (P < .05) using LSD procedure.

TABLE 2 pH of milk replacer fed via bulk group approaches

| | Preservation method: | |
|---|---|---|
| Time | Organic acids | Fermented |
| 0 hour | 6.98 | 6.98 |
| 28 hours | 4.43 | 4.67 |
| 52 hours | 4.43 | 4.78 |
| 76 hours | 4.36 | 4.47 |

TABLE 3

Carbohydrate content of hydrated, fermented milk replacer

| | Sampling time: | |
|---|---|---|
| Carbohydrate, g/100 g | 0 hr | 48 hr |
| Glucose | 0.219 | 0.106 |
| Sucrose | 0.158 | 0.018 |

TABLE 3-continued

Carbohydrate content of hydrated, fermented milk replacer

| Carbohydrate, g/100 g | Sampling time: | |
|---|---|---|
| | 0 hr | 48 hr |
| Maltose | 0.022 | 0.039 |
| Raffinose | 0.027 | 0.016 |
| Stachyose | 0.089 | 0.049 |

Summary: The data in Table 1 suggests that calves fed the fermented milk replacer performed equally while consuming less milk replacer. This increase in efficiency may be due to reduction of the indigestible and poorly digestible carbohydrates that are contained in this soy protein source, which is shown in Table 3. For example, after 48 hours, the indigestible sugars of raffinose and stachyose respectively are degraded by about 40 percent and 45 percent; and the poorly digestible sugar, sucrose is degraded by about 90 percent. The preserving effect through lowering pH by fermentation is presented in Table 2, where the pH of the fermented milk replacer ranged from between 4.47 and 6.98 over the course of 76 hours. Health of calves offered milk replacer via the different feeding approaches was not affected.

Trial 2: In this trial, calves were offered milk replacer via an automated feeder or one of two fermented calf milk replacer approaches. The control group received milk replacer through the automated feeder. The first fermented milk replacer approach used calf milk replacer treated with the lactic acid-producing starter culture according to Trial 1, and the second approach additionally treated the fermented calf milk replacer with an enzyme.

Twenty-seven (27) calves (nine animals per treatment) were allotted to the automated calf feeder (Forster Technik Vario Milk Powder Feeder, Gerwigstr, Germany) (control), or one of the two fermented bulk group approaches. All calves received milk replacer as in Trial 1, which contained 28 percent protein by dry weight of the milk replacer and 20 percent fat by dry weight of the milk replacer, where the milk replacer contained 10 units of protein-modified soy produced according to the description above. Automated feeder-allotted calves were fed 2.78 pounds of milk replacer solids, daily. Fermented CMR groups had free access to milk replacer during this trial (13% solution). Starter feed containing 22 percent protein by weight (identified as Dry Feed in the tables to follow) was offered ad libitum to all calves. Blood samples were collected from all animals to ensure that colostrum was consumed and the Ig status was similar.

TABLE 4

Performance of calves fed milk replacer via different feeding system
Treatment:

| | 1 Auto Feeder | 2 Fermented | 3 Fermented/ Enzyme | S.E. |
|---|---|---|---|---|
| Initial Ig | 3.78 | 4.14 | 3.67 | 0.28 |
| Calf Weights, lbs. | | | | |
| Day 0 | 99.54 | 99.83 | 99.48 | 0.62 |
| Day 42 | 149.42 | 144.94 | 148.43 | 4.26 |
| Avg. Gain, lbs. | | | | |
| Wk 1&2 | 10.02 | 14.13 | 11.54 | 2.31 |
| Week 3 | 13.87 | 11.66 | 13.44 | 1.54 |
| Week 4 | 11.44 | 7.70 | 8.04 | 1.74 |
| Week 5 | 7.66 | 8.91 | 8.59 | 1.35 |
| Week 6 | 6.89 | 2.71 | 7.33 | 1.91 |
| Total Gain | 49.88 | 45.11 | 48.96 | 4.23 |
| Avg. Period MR Consumption, lbs. (DM Basis) | | | | |
| Total CMR | 79.15a | 90.15b | 92.75b | 1.82 |
| Avg. Period Dry Feed Consumption, lbs. (As Fed) | | | | |
| Total Dry Feed Cons. | 18.28 | 15.32 | 23.43 | |
| Body Volume, cm³ | | | | |
| Day 0 | 178.63 | 172.37 | 167.86 | 2.65 |
| Day 42 | 236.48 | 238.31 | 237.66 | 6.22 |
| Gain | 57.83 | 65.96 | 69.81 | 7.02 |
| Avg. Period Scour Score | | | | |
| Wk 1&2 | 1.26 | 1.07 | 1.20 | 0.07 |
| Period Scour Days | | | | |
| Wk 1&2 | 4.89 | 1.86 | 4.11 | 1.25 |
| Attitude Score | | | | |
| Weeks 1&2 | 1.16b | 1.00a | 1.09ab | 0.04 |

Means in the same row not followed by a common letter differ (P < .05) using LSD procedure.

TABLE 5 pH of milk replacer fed fermented milk replacer/enzyme

| Time | |
|---|---|
| 0 hour | 6.77 |
| 28 hours | 4.58 |
| 52 hours | 4.36 |
| 76 hours | 4.19 |

TABLE 6

Carbohydrate content of hydrated, fermented, enzyme containing milk replacer

| Carbohydrate, g/100 g | Sampling time: | |
|---|---|---|
| | 0 hr | 48 hr |
| Glucose | 0.245 | 0.083 |
| Sucrose | 0.136 | 0.018 |
| Raffinose | 0.028 | 0.013 |
| Stachyose | 0.107 | 0.060 |

Summary: As in Trial 1 and as reflected in Table 4, no differences were observed in the performance on calves between test groups. Those fed fermented milk replacer did consume more of milk than those fed by the automated feeder. As shown in Table 6, digestion by the bacterial culture more than halved the levels of the carbohydrates that the calf digests poorly. As shown in Table 5, pH dropped as in the previous trial due to the fermentation of these carbohydrates. This pH drop, in turn, preserved the remainder of the hydrated milk replacer.

Trial 3: Eighteen (18) calves were assigned to two small group feeders. Both groups were fed the same milk replacers. This milk replacer contained 25 percent protein by weight with 10.55 units of this protein derived from protein-modified soy. This milk replacer contained 17 percent by weight fat. Starter feed containing 22 percent by weight protein (identified as Dry Feed in the tables to follow) was offered ad libitum to all calves. Milk replacer was fed to calves for four weeks (calves were approximately 2 weeks of age at the beginning of the study). Milk replacer was offered via group feeders with additional milk replacer and water added to group feeder for 3 or 4 days. This vessel was cleaned twice weekly after which a new fermentation of milk replacer was initiated and fed. A lactic acid producing starter culture (as described in Trial 1) was offered on day one of feeding. In the second group feeder, in addition to lactic acid producing starter culture treatment, an enzyme preparation derived from *Aspergillus aculeatus* having various activities described above was added at the same time as the bacterial culture. The reduction in pH of the milk replacer across treatments was similar to that of the Fermented milk replacer treatment of Table 2. The results of this study are provided in Table 7 below.

TABLE 7

Fermented milk replacer feeding trials with and without enzymes

| Treatment | 2 Fermentation | 3 Fermentation W/Enzyme | P Value | SE |
|---|---|---|---|---|
| Initial Ig | 4.14 | 3.38 | 0.19 | 0.39 |
| Weight Day 14 | 108.54 | 106.06 | 0.57 | 3.05 |
| Weight Day 21 | 109.77 | 111.14 | 0.78 | 3.50 |
| Weight Day 28 | 117.90 | 118.57 | 0.91 | 4.22 |
| Weight Day 35 | 127.09 | 134.15 | 0.34 | 5.17 |
| Weight Day 42 | 132.31 | 141.31 | 0.23 | 5.26 |
| Avg. Gain, lbs. | | | | |
| Week 3 | 1.23 | 5.07 | 0.20 | 2.10 |
| Week 4 | 8.13 | 7.44 | 0.79 | 1.82 |
| Week 5 | 9.19 | 15.58 | <.01 | 1.61 |
| Week 6 | 5.23 | 7.16 | 0.49 | 1.97 |
| Total Gain | 23.77 | 35.25 | 0.02 | 3.07 |
| Avg. Period MR Consumption, lbs. (DM Basis) | | | | |
| Week 3 | 12.26 | 11.13 | No stat since calves were group fed | |
| Week 4 | 11.90 | 9.50 | | |
| Week 5 | 14.44 | 11.66 | | |
| Week 6 | 8.80 | 8.80 | | |
| Total CMR | 47.40 | 41.10 | | |
| Starter Intake, lbs. as-fed | | | | |
| Week 3 | 1.54 | 3.21 | | |
| Week 4 | 4.30 | 9.00 | | |
| Week 5 | 7.24 | 17.10 | | |
| Week 6 | 16.76 | 31.00 | | |
| Total Dry Feed Cons. | 29.80 | 60.30 | | |
| Average Feed:Gain | 3.52 | 3.26 | 0.73 | 0.52 |

Summary: Inclusion of the enzyme preparation increased starter intake and enhanced (P<0.02) gain of calves in this trial.

Overall Summary: These studies indicated that poorly digestible soybean carbohydrates by mammalian species are effectively fermented by bacteria. These carbohydrates were reduced by microbial fermentation of a hydrated milk replacer containing soy ingredients. The acid produced by this fermentation lowered the pH and, in turn, preserved the milk replacer for several days. Use of this application may enhance milk replacers fed to calves by elimination of poorly digested components. Addition of non-protein nitrogen to milk replacers may be a viable strategy for cheaply providing protein (microbial) to the calf.

As used herein, standard error ("SE") is the standard deviations of the sample in a frequency distribution, obtained by dividing the standard deviation by the total number of cases in the frequency distribution. A coefficient of variation ("C.V.") for data is the standard deviation of a particular variable divided by the mean of the variable and then multiplied by 100. "P" used in the Tables above is a probability value. For purposes of comparing data in this document, P values of 0.05, or lower, are considered to be statistically significant.

Although the present disclosure provides references to preferred embodiments, persons skilled in the art will recognize that changes may be made in form and detail without departing from the spirit and scope of the invention.

What is claimed is:

1. A method of feeding a young animal, comprising:
   in a tank or feeder, fermenting a liquid milk replacer comprising soy by treating the liquid milk replacer with an acid-producing bacteria; and
   feeding the young animal the fermenting liquid milk replacer.

2. The method of claim 1, wherein treating the liquid milk replacer with an acid-producing bacteria comprises adding a starter culture of the acid-producing bacteria to the liquid milk replacer in the tank or feeder.

3. The method of claim 1, wherein treating the liquid milk replacer with an acid-producing bacteria comprises adding a starter culture of the acid-producing bacteria to the liquid milk replacer prior to adding the liquid milk replacer to the tank or feeder.

4. The method of claim 1, wherein the fermenting liquid milk replacer has a pH of about 4.0 to about 6.0 when fed to the young animal.

5. The method of claim 1, wherein the liquid milk replacer comprises potassium sorbate.

6. The method of claim 5, further comprising activating the potassium sorbate by reducing the pH of the liquid milk replacer to below 6.0.

7. The method of claim 1, further comprising adding fresh liquid milk replacer to the tank or feeder without flushing the tank or feeder, wherein the fresh liquid milk replacer has not been inoculated with a starter culture of an acid-producing bacteria.

8. The method of claim 1, further comprising adding inoculated liquid milk replacer to the tank or feeder without flushing the tank or feeder, wherein the inoculated liquid milk replacer has been inoculated with a starter culture of an acid-producing bacteria.

9. The method of claim 1, wherein the young animal is a ruminant.

10. The method of claim 1, wherein the young animal is a monogastric animal.

11. The method of claim 1, further comprising treating the liquid milk replacer with an enzyme adapted to hydrolyze complex indigestible carbohydrates within the liquid milk replacer.

12. The method of claim 1, wherein the young animal is an unweaned calf, and wherein in response to ingesting the fermenting liquid milk replacer, the calf increases consumption of the feed.

13. The method of claim 1, wherein the acid-producing bacteria microbially digests between about 40 to about 60 percent of stachyose and raffinose present in the soy of the liquid milk replacer.

14. The method of claim 1, wherein the acid-producing bacteria is a lactic acid producing bacteria.

15. The method of claim 1, wherein the soy comprises protein-modified soy flour.

16. A method of feeding calves prior to weaning, comprising:
- in a tank or feeder, fermenting a liquid milk replacer comprising soy by treating the liquid milk replacer with an acid-producing bacteria; and
- feeding the young animal the fermenting liquid milk replacer for up to about 48 hours after initiating fermentation, wherein the fermenting liquid milk replacer has a pH of about 4.0 to about 6.0 when fed to the calves.

17. The method of claim 16, wherein the acid-producing bacteria digest carbohydrates that could otherwise be consumed by pathogenic bacteria.

18. The method of claim 16, wherein the fermenting liquid milk replacer lacks exogenous acids.

19. The method of claim 16, further comprising treating the liquid milk replacer with one or more enzymes to hydrolyze complex indigestible carbohydrates present within the liquid milk replacer.

20. The method of claim 19, wherein the one or more enzymes are isolated from *Aspergillus aculeatus*.

* * * * *